(12) United States Patent
Ronse

(10) Patent No.: US 12,139,181 B2
(45) Date of Patent: Nov. 12, 2024

(54) METHOD AND SYSTEM FOR MONITORING OF RAIL WAGON HAND BRAKE

(71) Applicant: Ovinto cvba, Aalter (BE)

(72) Inventor: Frederick Ronse, Knokke-Heist (BE)

(73) Assignee: OVINTO CVBA, Aalter (BE)

( * ) Notice: Subject to any disclaimer, the term of this patent is extended or adjusted under 35 U.S.C. 154(b) by 0 days.

(21) Appl. No.: 16/483,052

(22) PCT Filed: Jan. 31, 2018

(86) PCT No.: PCT/EP2018/052441
§ 371 (c)(1),
(2) Date: Aug. 2, 2019

(87) PCT Pub. No.: WO2018/141816
PCT Pub. Date: Aug. 9, 2018

(65) Prior Publication Data
US 2020/0231192 A1 Jul. 23, 2020

(30) Foreign Application Priority Data

Feb. 2, 2017 (EP) ..................................... 17154435

(51) Int. Cl.
*B61H 13/20* (2006.01)
*B60T 17/22* (2006.01)
*B61H 13/04* (2006.01)

(52) U.S. Cl.
CPC ............ *B61H 13/20* (2013.01); *B60T 17/228* (2013.01); *B61H 13/04* (2013.01)

(58) Field of Classification Search
CPC ..... B61H 13/04; B61H 13/20; G01S 2205/00; G01S 2205/001; B60T 2220/00
See application file for complete search history.

(56) References Cited

U.S. PATENT DOCUMENTS 2,299,402 A * 10/1942 Mersereau ............. B61H 13/04
74/505
3,854,417 A 12/1974 MacDonnell
4,417,466 A * 11/1983 Panetti ................... G01B 21/20
73/105

(Continued)

FOREIGN PATENT DOCUMENTS

CN 102016647 B * 5/2013 ........... G01V 5/0008
DE 102004061223 A1 * 8/2006 .............. F01C 1/073

(Continued)

*Primary Examiner* — Melody M Burch
(74) *Attorney, Agent, or Firm* — Cermak & McGowan LLP; James Creighton Wray; Malcolm K. McGowan

(57) ABSTRACT

The current invention relates to a method for monitoring a hand brake (1) of at least one rail wagon, preferably unpowered rail wagon, comprising a chassis by means of a monitoring system (33, 34); said hand brake comprising a hand-operated mechanical device, a brake linkage system and at least one brake pad; said hand-operated mechanical device, said brake linkage system and said at least one brake pad mechanically connected; said monitoring system comprising a detection module and a monitoring module; said detection module comprising at least one detector element (33, 34); said monitoring module comprising a processor, tangible non-volatile memory, instructions on said memory for instructing said processor; said method comprising a plurality of steps.

6 Claims, 3 Drawing Sheets

(56) References Cited

U.S. PATENT DOCUMENTS

| | | | | |
|---|---|---|---|---|
| 5,987,979 | A * | 11/1999 | Bryan | B61K 9/08 |
| | | | | 33/1 Q |
| 6,006,868 | A | 12/1999 | Klink | |
| 6,170,619 | B1 | 1/2001 | Sheriff et al. | |
| 6,364,069 | B1 * | 4/2002 | Ring | B60T 7/02 |
| | | | | 188/1.11 R |
| 6,474,450 | B1 * | 11/2002 | Ring | B60T 7/02 |
| | | | | 188/1.11 R |
| 7,501,627 | B1 * | 3/2009 | Herr | G01J 1/02 |
| | | | | 250/338.1 |
| 9,026,281 | B2 | 5/2015 | Murphy et al. | |
| 2003/0058091 | A1 * | 3/2003 | Petersen | B61H 13/02 |
| | | | | 340/457.3 |
| 2004/0150259 | A1 * | 8/2004 | Michel | B60T 13/665 |
| | | | | 303/2 |
| 2008/0252515 | A1 | 10/2008 | Oestermeyer et al. | |
| 2009/0240400 | A1 * | 9/2009 | Lachapelle | B60R 25/04 |
| | | | | 701/45 |
| 2012/0046811 | A1 | 2/2012 | Murphy et al. | |
| 2012/0271523 | A1 | 10/2012 | Sardari Iravani | |
| 2014/0060979 | A1 | 3/2014 | Martin et al. | |
| 2015/0336013 | A1 * | 11/2015 | Stenzler | G06K 9/00771 |
| | | | | 700/90 |

FOREIGN PATENT DOCUMENTS

| | | | | |
|---|---|---|---|---|
| EP | 2556853 B1 * | 7/2015 | | A61M 5/36 |
| EP | 3556624 A1 * | 10/2019 | | B61L 15/0081 |

\* cited by examiner ated particularly when one or more of them is a worn, especially inasmuch as such a worn component may have a widely and unpredictably varying position with respect to a reference, such as a fixed reference element.

METHOD AND SYSTEM FOR MONITORING OF RAIL WAGON HAND BRAKE

This application claims the benefit of European Application No. 17154435.6 filed Feb. 2, 2017 and PCT/EP2018/052441 filed Jan. 31, 2018, International Publication No. WO 2018/141816 A1, which are hereby incorporated by reference in their entirety as if fully set forth herein.

TECHNICAL FIELD

The invention pertains to the technical field of monitoring of rail wagons, such as unpowered rail wagons.

BACKGROUND

U.S. Pat. No. 6,006,868 discloses a related system for monitoring hand brake status on a rail car, which however lacks robustness.

U.S. Pat. No. 9,026,281 describes a device for monitoring the status of a railcar hand brake having a hand-operated handle, which device has a load bearing member configured to be inserted in the linkage of a railcar hand brake system so that the force applied to the brake system passes through the load bearing member. A strain gauge mounted on the load bearing member measures the strain. The information from the strain gauge is indicative of the force applied by the hand brake to the brake and is used to determine the status of the hand brake. Means for determining motion of the railcar is also provided. In one form, if it is determined that the brake is on and the railcar is in motion, information, such as an alarm, is transmitted. A system and method of monitoring a railcar handbrake are also provided.

Since the concept of U.S. Pat. No. 9,026,281 is based on the measurement of strain, it lacks a means for determining the status of the hand brake when no load is applied on the load bearing member. Also, the concept lacks accuracy because it is based on strain measurement, which is an unreliable indicator of the hand brake status. Indeed, the exact strain excised in the hand brake system depends on many environment factors such as temperature and humidity, and may evolve over time due to wear of the hand brake system. Moreover, the concept revealed in U.S. Pat. No. 9,026,281 assumes that force can be "tapped" from the hand brake system to be guided through a strain gauge, which results in overly complex and/or inaccurate monitoring, and may even disrupt the proper functioning of the hand brake in case of problems with the monitoring mechanism/system.

US 2008/0252515 discloses a system for monitoring railroad cars comprising a hatch cover assembly including a cover body, a sensor, a wireless transmitter for transmitting data received from the sensor, a wireless receiver for receiving the data from the wireless transmitter, and a satellite transmitter for transmitting the data to a satellite. The wireless receiver and the satellite transmitter are attached to the hatch cover assembly. In one embodiment, the sensor is a chain tension sensor attached to a hand brake chain.

As the system described in US 2008/0252515 is based on the measurement of strain in a hand brake system comprising a chain, the system lacks means for monitoring hand brakes that do not comprise a chain. Moreover, the system is overly complex and lacks accuracy because it is based on the measurement of strain, which is, as said, an unreliable indicator of the hand brake status, due to the reasons stated above.

U.S. Pat. No. 3,854,417 discloses an automatic visual hand brake indicator system for truck mounted and conventional type hand brakes provides indicator flags that move between an OFF position adjacent the car and an ON position projecting beyond the sides of the car to be visible from anywhere alongside a track or train of cars.

The system according to U.S. Pat. No. 3,854,417 allows monitoring of the hand brake system but lacks flexibility, because the monitoring is limited to a visual signal, which requires an inspector to be sufficiently close to see the signal. Moreover, the system of U.S. Pat. No. 3,854,417 comprises a complex combination of moving parts actuated by the hand brake system. This is disadvantageous, since it may disrupt the proper functioning of the hand brake.

US 2012/0271523 provides a method for operating an automated parking brake in a motor vehicle whose drive train includes a transmission and a clutch, an instantaneous clutch engagement point is ascertained during a driving operation of the motor vehicle and the presence of a starting request is checked when the parking brake is activated. If the presence of a starting request is detected, the activated parking brake is automatically released, the detection of the presence of a starting request taking place as a function of the ascertained clutch engagement point.

The method according to US 2012/0271523 relates to the hand brake (parking brake) of a vehicle but lacks adaptation to the particular case of a hand brake of a rail wagon. Moreover, the method does not apply if the vehicle does not comprise a clutch. Furthermore, the method is primarily concerned with the automatic release of the parking brake, without providing any means to monitor the status of the hand brake other than means provided in the state of the art.

The present invention aims to resolve at least some of the problems mentioned above.

SUMMARY OF THE INVENTION

In a first aspect, the present invention provides a method for monitoring a hand brake of at least one rail wagon, preferably unpowered rail wagon.

Hereby, said rail wagon may be any cargo or tank rail wagon or other suitable railway wagon used for the carrying of cargo on a rail transport system which, when coupled together and hauled by one or more locomotives, form a train. The term "unpowered rail wagon" as used herein refers to embodiments wherein the rail wagon is not provided with electrical power for its operation. In such an embodiment, the hand brake mechanism does not require electrical power since no electrical power is available to the rail wagon. An example of an unpowered rail wagon is a cargo wagon.

The method according to the present invention advantageously provides an evaluation based on the relative position of a first detector element fixed with respect to the chassis and of a second detector element fixed with respect to a portion of the brake linkage system. Through this combination, the monitoring is more robust, more accurate, more user-friendly and more energy-efficient than prior methods lacking said second detector element, such as the one disclosed in U.S. Pat. No. 6,006,868.

Hereby, the invention advantageously relies on distance measurement between separate and tangible detector elements, rather than taking one or more components of the brake linkage system as reference and performing a measurement directly on these one or more components. This is particularly important in cases where said one or more components fail to provide reliable reference. A separate second detector element provides for a better reference than the components of the brake linkage system themselves for instance in view of changing surface features of the chosen component over time, e.g. due to the presence of rust, dirt or moist on the surface of the chosen component. All this may lead to unreliable measurements when the one or more components are used as reference. Furthermore, a separate second detector element is advantageous for maintenance operations. In one case, the maintenance may involve the cleaning or processing of the surface of the components, which leads to deterioration of the reference value of these components, requiring at least a recalibration, which may be costly and/or difficult. Opposed to this, preferably, the separate second detector element such as e.g. a magnet may be robust against such cleaning or processing. Alternatively, the separate second detector element may be locally protected against the cleaning or processing by covering it e.g. with a piece of masking tape. In yet another embodiment, the second detector element is releasably attached, e.g. by means of a removable sticker, removable glue or one or two screws, and may be easily removed before the cleaning or processing and put back afterwards, with no re-calibration required. Also, the releasably attachable character may allow for easy calibration, whereby the detector element is repositioned iteratively until some predefined calibration criterion is met. Furthermore, importantly, maintenance may require the replacement of the one or more components, whereby the new components typically have different surface characteristics due to the absence of rust or dirt and/or because they are from another parts provider or of another type. While this implies the need for considerable re-calibration efforts in case the component is used as reference, these efforts are reduced or even avoided in a preferred embodiment wherein the second detector element can be easily removed from the old component and attached to the new component, as in the exemplary case of a magnet as second detector element.

Related, the invention is more accurate and energy-efficient. By providing an identifiable second detector element with maximum dimension preferably smaller than 60 mm, the position of the second detector element is more accurately and efficiently determinable than when the position of an entire component is to be tracked. Overall, prior art methods without a second detector element relying on one or more components as reference suffer lack of accuracy and/or efficiency due to the scattering of the signal used for detection over the large and potentially irregular surface of the one or more components. For instance, the method and system disclosed in U.S. Pat. No. 6,006,868 will lack accuracy due to scattering of the signal used for detection over the irregular surface of the linkages of the breaking system.

In a preferred embodiment of the present invention, one of said first and second detector element is an emitter detector element adapted for emitting a signal originating from said emitter detector element, said signal preferably being a continuously emitted signal; and wherein the other of said first and second detector element is a receiver detector element adapted for detecting said signal from said emitter detector element.

Hereby, "active detector element" refers to a detector element that consumes electrical energy in its operation and hence may require electrical power by cable or battery or equivalent means such as energy harvesting. In contrast to this, "passive detector element" refers to a detector element that does not consume electrical energy in its operation and hence does not require electrical power. Furthermore, said signal originating from the emitter detector element refers to a signal such as a magnetic wave or a light wave emitted by the emitter detector element without intervention of the receiver detector element. The signal may for instance comprise magnetic waves, where the emitter detector element concerns a magnet, or light waves, where the emitter detector element concerns an optically detectable tag. In the latter case, the light waves may originate from external light, preferably continuously provided light from a light source in close proximity to and/or comprised in the emitter detector element, shedding light upon and/or illuminating the optically detectable tag and being emitted towards the active detector element. In a related embodiment, the optically detectable tag may comprise a fluorescent or beta-radiation-based surface.

Such an embodiment is advantageous since it avoids the drawbacks of a typical detection mechanism, whereby one detector element, say the first detector element, acts both as emitter and receiver, which results in a round trip of the signal, whereby the distance between the first and second detector element is bridged twice. By making one detector element emitter and one detector element receiver, said distance is bridged only once. Since signal intensity typically drops faster than proportional with distance, the energy efficiency and accuracy of a method with separated emitter and receiver is significantly improved over state of the art methods and systems with emitter and receiver comprised in a single detector element. For instance, in case of spherically homogeneous emission of the signal, the signal intensity is inversely proportional with the square of said distance. Accordingly, signal intensity is increased by a factor 4 if sender and receiver are provided separately in said first and second detector element instead of being combined in a single detector element. This may leads to an improved SNR in the receiver detector element leading to improved accuracy and/or to reduced requirements on the emitter relating to signal intensity.

In a second aspect, the present invention provides a rail wagon, preferably an unpowered rail wagon.

In a third aspect, the present invention provides a monitoring system for monitoring a hand brake of at least one rail wagon, preferably unpowered rail wagon, according to the present invention, said monitoring system configured for performing a method according to the present invention.

In a fourth aspect, the present invention provides a kit for monitoring a hand brake of at least one rail wagon, preferably unpowered rail wagon.

The advantage of such an unpowered rail wagon, such a monitoring system and such a kit are similar to those of a method according to the present invention. Additionally, such a kit is advantageous in that it can easily be used to mount a monitoring system on an existing rail wagon with pre-installed hand brake.

Further preferred embodiments as well as examples are discussed in the detailed description section.

DETAILED DESCRIPTION OF THE INVENTION

Figure 1:
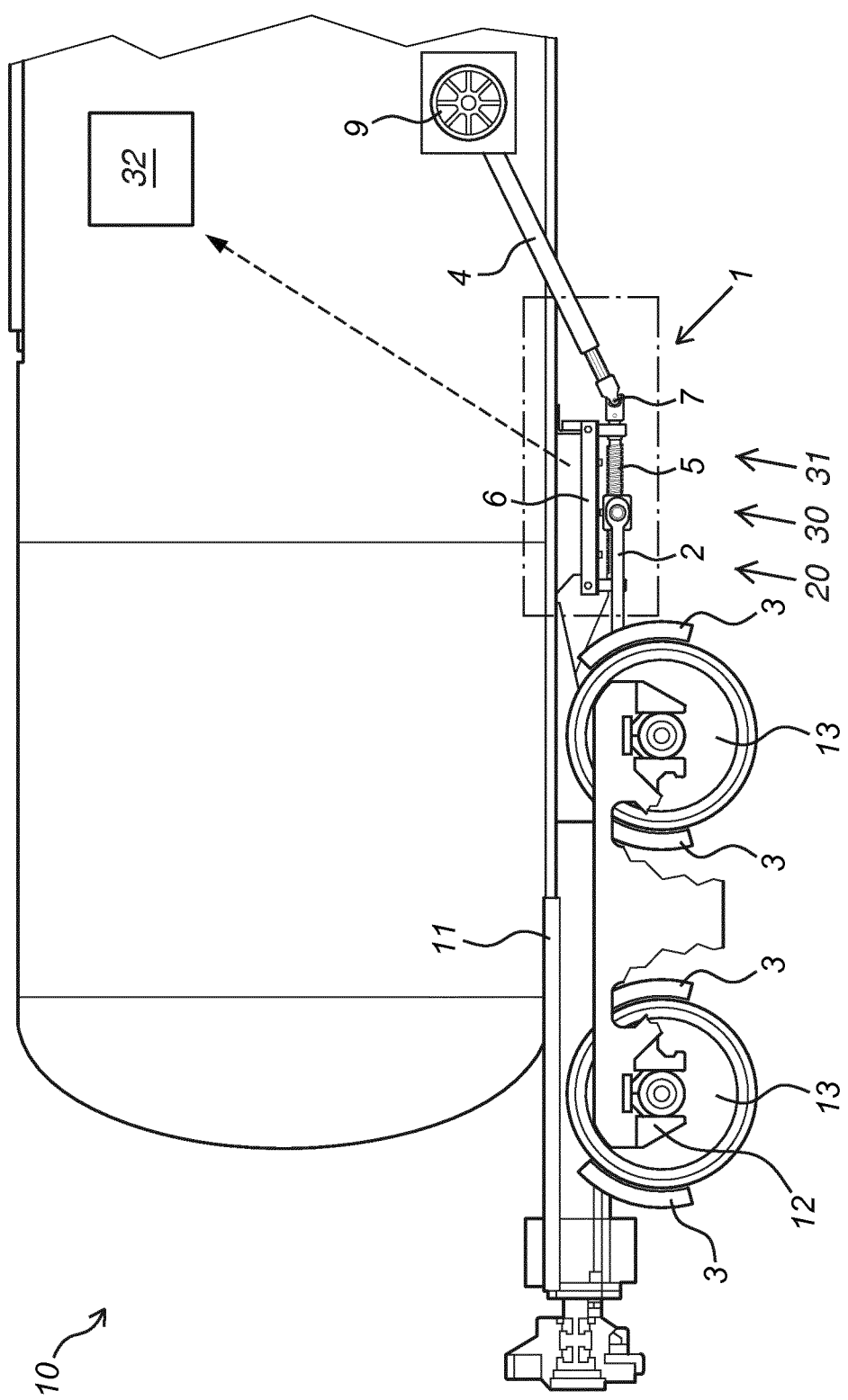
FIG. 1 shows an example embodiment of a cargo wagon according to the present invention.

Rail wagons are generally cargo or tank rail wagons, or other suitable railway wagons used for the carrying of cargo on a rail transport system which, when coupled together and hauled by one or more locomotives, form a train. This type of rail wagons is also referred to as railway wagons, goods wagons, freight wagons, freight cars, etc. Of particular importance to the present application are unpowered rail wagons, also referred to as unpowered transport units. These units comprise a chassis with which the unpowered transport unit is loosely laid on different stand-alone entities consisting of one axle and a pair of wheels, also referred to as wheelsets. Such a wheelset is the assembly of the wheels connected by an axle of a railway wagon rolling on the railway track. In most cases railway wagons have two bogies, each comprising two or three wheelsets. These bogies or trucks form a frame assembly beneath each end of the railway wagon which holds the wheelsets and allows for rotation around a generally vertical axis of rotation with respect to the railway wagon. However, it is possible, for example with short freight cars, to mount the wheelsets without bogies, for example two wheelsets at both ends of such a short freight car directly mounted to the railway wagon chassis. Such transport units, which are unpowered railway vehicles lack any form of on-board propulsion and often lack any form of power supply.

The term "hand-operated device" refers to any type of handle that is suitable for being operated by hand by an operator. Examples of such hand-operated devices include a braking wheel, a braking lever or a braking switch.

Rail wagons are typically equipped with hand brakes which can be set or engaged when the wagons are held in the railroad yard. Occasionally the operator forgets to disengage the hand brake and the railroad wagon is dragged with the hand brake remaining engaged. With the hand brake engaged, the wagon wheels skid rather than roll. This may cause a flat spot on the wheels and/or ruin the brake shoes. A flattened wheel in a bad shape will not turn round anymore and will cause vibrations and constitute a risk to derail because of its inadequate form on the rails. Therefore, every rail wagon wheel has to be grinded and sharpened every 100.000 km and has to be changed together with the complete axle every 1.000.000 km, due to the fact that the two wheels and the axle are made out of a single piece of metal.

Several embodiments of the present invention provide the wagon owner with the benefit of monitoring the state of hand brake disengagement of the wagon, preventing the risk of ending up with flattened wheels or, worse, the derailment of a rail wagon or a complete train.

The present invention aims to resolve some of the problems mentioned with state of the art methods and systems. The invention thereto aims to provide a hand brake monitoring method and system that do not rely on strain in the hand brake in the determining of the status of the hand brake. Furthermore, the invention aims to furnish a monitoring method and system that do not lead to risks of disrupting the proper functioning of the hand brake.

In the context of the present invention, the monitoring system concerns all devices and circuitry physically attached to the rail wagon. The monitoring system may communicate with a device that is external to the rail wagon. Examples of such an "external device" are a server, e.g., for remote monitoring, and a read-out device, e.g., for receiving data collected by the monitoring system.

In the context of the present invention, the term "GNSS" refers to a global navigation satellite system, such as GPS, GLONASS, Galileo, BeiDou, etc.

In this document, a detector element is said to be "releasably attached" or "releasably attachable" if it can be unmounted and remounted according to some simple and predefined procedure without difficulty. This may relate for instance to the use of a removable sticker, removable glue or one or two screws.

In the context of the present invention, the hand brake comprises a brake linkage system comprising all parts of the hand brake that undergo a dislocation with respect to the chassis when the hand brake is engaged or disengaged.

In this document, a detector element concerns an element belonging to the detection module. A detector element may comprise a detector, such as a reed switch or an optical detector, or a detectable element, such as a magnet or an optically-detectable tag. A detector element may comprise any number and any combination of detectors and detectable elements.

A reed switch is an electrical switch operated by applying a magnetic field. It comprises at least a pair of contacts. The contacts are normally in a first position, here referred to as the non-magnetized position, but switch to a second position when a magnetic field is present, here referred to as the magnetized position. In a preferred embodiment, the contacts are normally open (non-magnetized position) but close when a magnetic field is present (magnetized position). In an alternative embodiment, the contacts are normally closed (non-magnetized position) but open when a magnetic field is present (magnetized position). According to a preferred embodiment, the position is switched under the influence of a magnetic field originating from a piece of ferromagnetic material such as a permanent magnet. When the permanent magnet is sufficiently near to the reed switch in order for it to switch to the second position, the permanent magnet and the reed switch are said to be within each other's range. In the opposite case, the permanent magnet and the reed switch are said to be out of each other's range. Thereby, the reed switch act as detector, able to detect whether the magnet is near to it or not. Both the reed switch and the magnet are said to be detector elements. Related, in this document, an optical detector acts as the detector of an optically-detectable tag, whereby both the optical detector and the optically-detectable tag are detector elements.

According to several aspects set out in the summary section, the present invention provides a method, a rail wagon, a monitoring system and a kit. One of ordinary skill in the art will appreciate that the system may be configured to execute steps which are equivalent to the steps comprised in the method. One of ordinary skill in the art will furthermore appreciate that the system and the rail wagon according to the present invention are equipped so as to enable execution of the method according to the present invention. Therefore, in this document, no distinction is made between the different aspects of the present invention, and each element of the disclosure may relate to each of the different aspects of the present invention.

In a first aspect, the invention provides a method for monitoring a hand brake.

In a preferred embodiment, at least one of the first and second detector element is releasably attached or attachable, e.g. by means of a removable sticker, removable glue or one or two screws. In a more preferred embodiment, the second detector element is releasably attached. In a most preferred embodiment, those detector elements being wireless passive elements, preferably the second detector element, is releasably attached. This provides the advantage that the portion of the brake monitoring system on which the detector element is mounted may be easily cleaned, processed or replaced while impacting the monitoring system only to a limited extent. In embodiments where the releasably attached detector element is a wireless element or preferably a wireless passive element such as a simple magnet, no wires run out of the element, yielding an easy mounting and unmounting of the detector element. Related, the monitoring system may easily be calibrated or be recalibrated by repositioning one of the detector elements that is releasably attached. In another embodiment wherein each of the detector elements is wireless, each of the detector elements may preferably be releasably attached. This may considerably reduce maintenance difficulty and/or cost.

In a preferred embodiment, one of said first and second detector element is a wireless passive detector element adapted for being detected by the other of said first and second detector element; wherein the other of said first and second detector element is an active detector element adapted for detecting said passive detector element; and wherein preferably said passive detector element is said emitter detector element and said active detector element is said receiver detector element. This is advantageous, particularly because it avoids the need for wires, facilitating the attachment of said passive detector element to the brake linkage system.

In another preferred embodiment, which is preferably combined with said second detector element being a passive wireless detector element, at least said second detector element is releasably attached; wherein a maximum dimension L of said passive detector element is smaller than 60 mm, preferably smaller than 50 mm, more preferably smaller than 40 mm, most preferably smaller than 30 mm. This leads to a compact and user-friendly design, whereby the second detector element may easily be removed for maintenance and/or easily be repositioned during calibration.

In another preferred embodiment, said rail wagon is an unpowered rail wagon; wherein each detector element including said first and second detector element comprised in said detection module is wireless and preferably releasably attachable, wherein said active detector element is an electrical battery-powered detector element comprising detection means for detecting said passive detector element and a wireless module interface for short-range data transmission; wherein said wireless module interface is used for said communicating of said state to said monitoring module in step (b). Such an embodiment advantageously addresses the problem of power not being available in the rail wagon while at the same time providing for easy mounting and unmounting during maintenance and for ease of use without cables running out of the detector elements.

In yet another embodiment, said first and second detector element are within each other's range if a distance between said first and second detector element is smaller than a maximum radius value R1, said maximum radius value R1 being smaller than 80 mm, preferably smaller than 50 mm, more preferably smaller than 30 mm. Such a small radius value R1 is advantageous since it leads to high signal intensity of the signal to be detected, leading to accurate performance and/or simple implementation of the detector elements.

In a preferred embodiment of the present invention, the second detector element is confined to an essentially linear movement with respect to the chassis during the engaging and disengaging of said hand brake. The advantage of such an embodiment is that it eases the monitoring of the dislocation of the brake linkage system, leading to simple and accurate monitoring. In practice, many hand brake systems such as the ones presented in the examples below support such an advantageous positioning of a detector element. This is in contrast to several prior art systems that are used to detect the movement of a chain belonging to the hand brake system. A chain does not adhere to a simple linear movement with respect to the chassis, but rather follows an unpredictable path, hence requiring a complex monitoring system that is prone to errors.

In a related preferred embodiment, the essentially linear movement of said second detector element with respect to the chassis comprises the guiding of said second detector element along a spindle; said spindle preferably belonging to a screw drive, whereby said spindle comprises a helical screw thread. Also the presence of such a spindle is advantageous because it allows for simple and accurate monitoring, relating to movement that is highly linear and therefore easy to monitor. In practice, many hand brake systems such as the ones presented in the examples below comprise such a spindle.

In a preferred embodiment, the monitoring module comprises a communication interface, preferably a satellite communication interface; and said method comprises an additional step (d) concerning the transmitting of said state to a server via said communication interface. The advantage thereof is that it makes monitoring information available remotely, making it accessible to operators potentially world-wide. This is advantageous for rail safety and rail management.

In a preferred embodiment, said monitoring module comprises a movement detector for detecting movement of said unpowered rail wagon; and a detection of the hand brake not being disengaged combined with a detection of a movement is a trigger for generating an alert to an operator, said alert preferably comprising a sound alarm at the unpowered rail wagon and, optionally, comprising an alert notification for communication to the remote server. Such a sound alarm is advantageous since it helps to warn an operator, helping to prevent the undesirable situation where a train wagon is dragged with hand brake engaged. Further, an alert notification available externally is advantageous since it improves rail safety and rail management quality in general. In a related embodiment, said movement detector comprises a global navigation satellite system (GNSS) receiver and/or an accelerometer. The use of a GNSS may be advantageous due to its high availability and high level of detail, revealing not only whether or not a rail wagon is moving but also allowing to deduce its position. In a preferred embodiment, said position is also monitored by the monitoring system according to the present invention. The use of an accelerometer may be advantageous due to its simplicity, cheapness and overall reliability as a means to monitor whether a rail wagon is standing still or not.

In another preferred embodiment, said detection module further comprises a third detector element fixed with respect to the chassis; wherein said state is further characteristic of the hand brake being engaged; and wherein the evaluating of said state involves determining whether said second and third detector element are within each other's range, thereby detecting that the hand brake is engaged; wherein preferably said second and third detector element are within each other's range if a distance between said second and third detector element is smaller than a second maximum radius value R2, said second maximum radius value R2 being smaller than 100 mm, preferably smaller than 80 mm, more preferably smaller than 60 mm; said second maximum radius value R2 preferably being larger than said maximum radius value R1. The advantage of such an embodiment is that both the state of engagement and disengagement can be monitored, leading to more precise and/or more reliable monitoring. In one related embodiment, this leads to higher precision in the determining of the exact state of the hand brake, allowing to quantify the level to which a hand brake is disengaged, rather than only considering the states of full engagement and full disengagement. In another related embodiment, this leads to redundancy in the monitoring and therefore increased reliability. The redundancy lies herein that when a state of full disengagement is being observed by means of the first and second detector this should be complemented by the (redundant) monitoring by the second and third detector, which should confirm the correctness of the observation. Furthermore, the small values of R1 and R2 lead to high signal intensity of the signal to be detected, leading to accurate performance and/or simple implementation of the detector elements. Hereby, it may be advantageous to set R2 larger than R1. As R2 relates the detection of the handbrake being engaged, R2 should be larger than R1 since the exact position of engagement may vary in view of brake wear and related factors, whereas R1 relates to the handbrake not being disengaged, which leads to a more predictable position for the corresponding detector element.

In another preferred embodiment, the detection module comprises a first pair of detector elements comprising said first and second detector element, and, optionally, a second pair of detector elements comprising said third and second detector element; whereby a first member of each pair comprises a reed switch and whereby a second member of each pair comprises a magnet; whereby said determining whether said first and second detector element are within each other's range, and, optionally, said determining whether said second and said third detector element are within each other's range, involves determining that said reed switch is magnetized due to the proximity of said magnet, thereby detecting that the hand brake is disengaged, and, optionally, engaged, respectively. Hereby, note that this includes a variety of embodiments, such as embodiments with a single reed switch (comprised in the second detector element) and two magnets, as well as embodiments with two reed switches (comprised in the first and third detector element) and a single magnet. The advantage of an embodiment with a reed switch and a magnet is that it is cheap and reliable, and typically much cheaper than a device for strain measurement. Also, the replacement of a basic component such as a reed switch or magnet is typically cheaper and simpler than a component for strain measurement.

In yet another embodiment of the present invention, the detection module comprises a first pair of detector elements comprising said first and second detector element, and, optionally, a second pair of detector elements comprising said third and second detector element; whereby a first member of each pair comprises an optical detector and whereby a second member of each pair comprises an optically-detectable tag; whereby said determining whether said first and second detector element are within each other's range, and, optionally, said determining whether said second and said third detector element are within each other's range, involves determining that said optically-detectable tag is detected by said optical detector, thereby detecting that the hand brake is disengaged, and, optionally, engaged, respectively. Hereby, note that this includes a variety of embodiments, such as embodiments with a single optical detector (comprised in the second detector element) and one or two magnets, as well as embodiments with two optical detectors (comprised in the first and third detector element) and a single magnet. The advantages of an embodiment with an optical sensor and an optically-detectable tag are similar to those of an embodiment with a reed switch and a magnet. In a possible embodiment, a combination is made of a reed switch, a magnet, an optical detector and an optically-detectable tag. The advantage of such a combination is the enhanced accuracy and/or the redundancy that allows for better reliability. In a related preferred embodiment, the one or more optically-detectable tags concern the reed switch and/or the magnet.

In a preferred embodiment, the detection module comprises at least one electrical battery-powered detector element comprising a wireless module interface for short-range data transmission; whereby said wireless module interface is used for said communicating of said state to said monitoring module in step (b). This provides the advantage of avoiding the use of wires in the vicinity of the braking system, which after all is a rough environment, in which wires may easily break if unprotected.

In a preferred embodiment, the invention comprises said step (c) concerning the storing of said state and preferably a timestamp on said memory of said monitoring module; said monitoring system (30) comprises at least one wireless system interface for short-range data transmission; and said wireless system interface is used for communicating of said state and, optionally, said timestamp, to a read-out device. Hereby, the read-out device acts as an external device. The communication between the monitoring system and the read-out device can be set up via a known wireless protocol/technology such as Bluetooth, RFID, Zigbee, WiFi, etc. The advantage of such an embodiment is that it enables a convenient approach to monitoring.

During use of the rail wagon, the monitoring system collects and accumulates data regarding the monitored hand brake.

During periodic checks or after a problem relating to the rail wagon, an operator reads out said data by means of a read-out device.

Such monitoring is advantageous because it prevents hand-brake-related problems and allows helps identifying root causes in case of minor problems and/or disasters such as derailment.

In a preferred embodiment of the present invention, the detection module comprises, apart from a first detector and a first detectable object such as a magnet or optically-detectable tag, also a second detector and/or a second detectable object.

In a first set of embodiments, the detection module comprises a single detector, combined with a first and second detectable element, such as a first and second magnet, or a first and second optically-detectable tag.

In a preferred embodiment, the first and second detectable element are mounted on the chassis. The single detector is mounted on the brake linkage system. Hereby, the detector elements are positioned with respect to each other to allow reliable monitoring. In this case, this implies that the first and second detectable element are mounted in the vicinity of the brake linkage system and of each other. Furthermore, the first detectable element is mounted on a bar or on another part of the chassis, in such a way that it is within range of the single detector when the hand brake is (completely) disengaged. The second detectable element is mounted on the chassis in such a way that it is within range of the single detector when the hand brake is engaged. In a further preferred embodiment, the brake linkage system comprises a brake linkage and a transmission, whereby the single detector is mounted on the transmission. In an alternative embodiment, the single detector is mounted on the brake linkage.

In another related embodiment, the first and second detectable element are mounted on the brake linkage system, whereby, e.g., the first detectable element is mounted on the transmission and the second detectable element is mounted on the brake linkage. The single detector is mounted on the chassis. Also here, the detector elements are positioned with respect to each other to allow reliable monitoring.

In a second set of embodiments, the detection module comprises a first and second detector, combined with a single detectable element.

In a preferred embodiment, the first and second detector are mounted on the chassis, and the single detectable element is mounted on the brake linkage system.

In another related embodiment, the first and second detector are mounted on the brake linkage system, and the single detectable element is mounted on the chassis.

For each embodiment, the detector elements are positioned with respect to each other to allow reliable monitoring.

According to a further embodiment of the present invention, the detection module comprises four or more detector elements mounted on or in the vicinity of the brake linkage system and/or the chassis. This allows for more accurate and/or more reliable monitoring.

According to another aspect of the invention, which is not intended to limit its scope in any way, the invention relates to following points 1-15.

1. Method for monitoring a hand brake (1) of at least one unpowered rail wagon (10) comprising a chassis (11) by means of a monitoring system (30); said hand brake (1) comprising a hand-operated mechanical device (9), a brake linkage system (20) and at least one brake pad (3); said hand-operated mechanical device (9), said brake linkage system (20) and said at least one brake pad (3) mechanically connected; said monitoring system (30) comprising a detection module (31) and a monitoring module (32); said detection module (31) comprising at least one detector element (33, 34, 35); said monitoring module (32) comprising a processor, tangible non-volatile memory, instructions on said memory for instructing said processor; said method comprising the subsequent steps of:
   (a) evaluating a state of said hand brake (1) belonging to said at least one unpowered rail wagon (10) by means of said detection module (31);
   (b) communicating said state to said monitoring module (32);
   (c) optionally, storing said state and preferably a timestamp on said memory of said monitoring module (32);
   characterized in that, said evaluating of said state involves a dislocation of said brake linkage system (20) with respect to a calibration point (33) fixed with respect to the chassis (11), and in that said state is characteristic of at least the hand brake (1) being disengaged.

2. Method according to preceding point 1, characterized in that, said detection module (31) comprises a first detector element (33) fixed with respect to the chassis (11) and a second detector element (34) fixed with respect to a portion of the brake linkage system (20); in that said first detector element (33) determines said calibration point; and in that said evaluating of said state involves determining whether said first and second detector element (33, 34) are within each other's range, thereby detecting that the hand brake (1) is disengaged.

3. Method according to preceding point 2, characterized in that, said second detector element (34) is confined to an essentially linear movement with respect to the chassis (11) during the engaging and disengaging of said hand brake (1).

4. Method according to the preceding point 3, characterized in that, said essentially linear movement of said second detector element (34) with respect to the chassis (11) comprises the guiding of said second detector element (34) along a spindle (5); said spindle (5) preferably belonging to a screw drive, whereby said spindle comprises a helical screw thread.

5. Method according to any of the preceding points 2 to 4, characterized in that, said detection module (31) further comprises a third detector element (35) fixed with respect to the chassis (11); in that said state is further characteristic of the hand brake (1) being engaged; and in that the evaluating of said state involves determining whether said second and third detector element (34, 35) are within each other's range, thereby detecting that the hand brake (1) is engaged.

6. Method according to the preceding points 2 to 5, characterized in that, said detection module comprises a first pair of detector elements comprising said first and second detector element (33, 34), and, optionally, a second pair of detector elements comprising said second and third detector element (34, 35); whereby a first member of each pair comprises a reed switch and whereby a second member of each pair comprises a magnet; whereby said determining whether said first and second detector element (33, 34) are within each other's range, and, optionally, said determining whether said second and said third detector element (34, 35) are within each other's range, involves determining that said reed switch is magnetized due to the proximity of said magnet, thereby detecting that the hand brake (1) is disengaged, and, optionally, engaged, respectively.

7. Method according to the preceding points 2 to 5, characterized in that, said detection module comprises a first pair of detector elements comprising said first and second detector element (33, 34), and, optionally, a second pair of detector elements comprising said second and third detector element (34, 35); whereby a first member of each pair comprises an optical detector and whereby a second member of each pair comprises an optically-detectable tag; whereby said determining whether said first and second detector element (33, 34) are within each other's range, and, optionally, said determining whether said second and said third detector element (34, 35) are within each other's range, involves determining that said optically-detectable tag is detected by said optical detector, thereby detecting that the hand brake (1) is disengaged, and, optionally, engaged, respectively.

8. Method according to any of the preceding points 1 to 7, characterized in that, said detection module (31) comprises at least one electrical battery-powered detector element comprising a wireless module interface for short-range data transmission; whereby said wireless module interface is used for said communicating of said state to said monitoring module (32) in step (b).

9. Method according to any of the preceding points 1 to 8, characterized in that, said method comprises said step (c) concerning the storing of said state and preferably a timestamp on said memory of said monitoring module (32); in that said monitoring system (30) comprises at least one wireless system interface for short-range data transmission; and in that said wireless system interface is used for communicating of said state and, optionally, said timestamp, to a read-out device.

10. Method according to any of the preceding points 1 to 9, characterized in that, said monitoring module (32) comprises a communication interface, preferably a satellite communication interface; and in that said method comprises an additional step (d) concerning the transmitting of said state to a server via said communication interface.

11. Method according to any of the preceding points 1 to 10, characterized in that, said monitoring module (32) comprises a movement detector for detecting movement of said unpowered rail wagon (10); and in that a detection of the hand brake (1) not being disengaged combined with a detection of a movement is a trigger for generating an alert to an operator, said alert preferably comprising a sound alarm at the unpowered rail wagon (10) and, optionally, comprising an alert notification for communication to the remote server.

12. Method according to the preceding point 11, characterized in that, said movement detector comprises a global navigation satellite system (GNSS) receiver and/or an accelerometer.

13. Unpowered rail wagon (10) comprising a monitoring system (30) for monitoring a hand brake (1) of said unpowered rail wagon (10); said unpowered rail wagon (10) comprising a chassis (11); said hand brake (1) comprising a hand-operated mechanical device (9), a brake linkage system (20) and at least one brake pad (3); said hand-operated mechanical device (9), said brake linkage system (20) and said at least one brake pad (3) mechanically connected; said monitoring system (30) comprising a detection module (31) and a monitoring module (32); said detection module (31) comprising at least one detector element (33, 34, 35); said monitoring module (32) comprising a processor, tangible non-volatile memory, instructions on said memory for instructing said processor; said monitoring system (30) configured for carrying out the subsequent steps of:
  evaluating a state of said hand brake (1) of said unpowered rail wagon (10) by means of said detection module (31);
  communicating said state to said monitoring module (32);
  optionally, storing said state and preferably a timestamp on said memory of said monitoring module (32);
  characterized in that, said evaluating of said state involves a dislocation of said brake linkage system (20) with respect to a calibration point (33) fixed with respect to the chassis (11), and in that said state is characteristic of at least the hand brake (1) being disengaged.

14. Monitoring system (30) for monitoring a hand brake (1) of at least one unpowered rail wagon (10) according to the preceding point 13, said monitoring system (30) configured for performing a method according to any of the preceding points 1 to 12.

15. Kit for monitoring a hand brake (1) of at least one unpowered rail wagon (10) according to a method according to any of the preceding points 1 to 12; said unpowered rail wagon (10) comprising a chassis (11); said hand brake (1) comprising a hand-operated mechanical device (9), a brake linkage system (20) and at least one brake pad (3); said hand-operated mechanical device (9), said brake linkage system (20) and said at least one brake pad (3) mechanically connected; said kit comprising:
  a detection module (31) comprising at least one detector element (33, 34, 35) for evaluating a state of said hand brake (1) belonging to said at least one unpowered rail wagon (10), whereby said evaluating of said state involves a dislocation of said brake linkage system (20) with respect to a calibration point (33) fixed with respect to the chassis (11), whereby said state is characteristic of at least the hand brake (1) being disengaged;
  a monitoring module (32) configured for receiving said state characteristic of at least the hand brake (1) being disengaged and configured for communicating said state to an external device.

In a further aspect preferably relating to point 1-15, the invention provides a method for monitoring a hand brake of at least one unpowered rail wagon comprising a chassis by means of a monitoring system; said hand brake comprising a hand-operated mechanical device, a brake linkage system and at least one brake pad; said hand-operated mechanical device, said brake linkage system and said at least one brake pad mechanically connected; said monitoring system comprising a detection module and a monitoring module; said detection module comprising at least one detector element; said monitoring module comprising a processor, tangible non-volatile memory, instructions on said memory for instructing said processor; said method comprising the subsequent steps of:
  (a) evaluating a state of said hand brake belonging to said at least one unpowered rail wagon by means of said detection module;
  (b) communicating said state to said monitoring module;
  (c) optionally, storing said state and preferably a timestamp on said memory of said monitoring module;
characterized in that, said evaluating of said state involves a dislocation of said brake linkage system with respect to a calibration point fixed with respect to the chassis, and in that said state is characteristic of at least the hand brake being disengaged.

A key advantage of such a method and related methods according to the present invention is the accurate, secure and robust monitoring of the state of hand brake disengagement of the wagon, preventing the dangerous situation where an operator forgets to disengage the hand brake and the rail wagon is dragged with the hand brake remaining engaged. By preventing this situation, the invention helps preventing hand-brake-related damage such as flattened wheels and, importantly, helps preventing the derailment of a rail wagon or a complete train due to flattened wheels. Some embodiments of the present invention provide the operator with an alarm sound when such a situation arises.

The method is accurate, secure and robust because it relies on the dislocation of the brake linkage system with respect to a calibration point, rather than relying on a strain in the braking linkage system. Prior art systems and methods based on strain measurement lack accuracy because the exact strain excised in the hand brake depends on many environment factors such as temperature and humidity, and may evolve over time due to wear of the hand brake. Moreover, measuring strain requires that force can be tapped from the hand brake, which results in overly complex and/or inaccurate monitoring, and may even disrupt the proper functioning of the hand brake in case of problems with the monitoring mechanism/system. In contrast, relying on the dislocation of the brake linkage system leads to more accurate and robust measurement, particularly because many traditional hand brakes comprise parts that move essentially linearly with respect to the rail wagon that carries the hand brake. Therefore, the present invention relates to several simple and elegant embodiments in which the engaging and disengaging of the brake amounts to a linear movement of a hand brake part, of which the status can be easily tracked by means of no more than one or several detector elements. Relying on the dislocation of the brake linkage system further allows for safer monitoring, because no strain has to be tapped from the hand brake, minimizing the risk of disruption of the functioning of the hand brake due to a problem in the monitoring system.

A further advantage of the present invention is that it is particularly robust against wear of the hand brake system. Indeed, the wear of braking pads leads to deviations over time in both the strain in and the dislocation of the brake linkage system during engagement of the hand brake. In contrast, regardless of the wear level of the brake pads, the dislocation of the brake linkage system when the hand brake is completely opened remains largely the same throughout the lifetime of the hand brake. Therefore, by focusing on the disengagement of the hand brakes rather than the engagement, the present invention provides a much more robust solution to the problem of hand brake monitoring than prior art systems and methods. Hereby, note that in order to prevent the dragging of the train wagon with engaged hand brakes, it is indeed recommendable to focus on the state of full disengagement, since this is the only state that guarantees that no harm is done to the rail wagon. Prior art systems that focus only on engagement of the hand brakes may fail to identify a state of partial engagement. Such systems may be useful when preventing the dangerous situation of an unattended rail wagon of which the hand brakes are not completely engaged, but they are inadequate to prevent the situation of a dragged train wagon with partially engaged hand brakes. In contrast, the present invention is fully adequate to also handle the latter situation.

In a preferred embodiment, said detection module comprises a first detector element fixed with respect to the chassis and a second detector element fixed with respect to a portion of the brake linkage system; said first detector element determines said calibration point; and said evaluating of said state involves determining whether said first and second detector element are within each other's range, thereby detecting that the hand brake is disengaged. This provides the advantage that a clear and compact implementation is possible, in which only two distinct point require monitoring, rather than requiring the monitoring of an entire brake linkage system.

In another aspect preferably relating to point 1-15, the present invention provides an unpowered rail wagon comprising a monitoring system for monitoring a hand brake of said unpowered rail wagon; said unpowered rail wagon comprising a chassis; said hand brake comprising a hand-operated mechanical device, a brake linkage system and at least one brake pad; said hand-operated mechanical device, said brake linkage system and said at least one brake pad mechanically connected; said monitoring system comprising a detection module and a monitoring module; said detection module comprising at least one detector element; said monitoring module comprising a processor, tangible non-volatile memory, instructions on said memory for instructing said processor; said monitoring system configured for carrying out the subsequent steps of:
- evaluating a state of said hand brake of said unpowered rail wagon by means of said detection module;
- communicating said state to said monitoring module;
- optionally, storing said state and preferably a timestamp on said memory of said monitoring module;

characterized in that, said evaluating of said state involves a dislocation of said brake linkage system with respect to a calibration point fixed with respect to the chassis, and in that said state is characteristic of at least the hand brake being disengaged.

In another aspect preferably relating to point 1-15, the present invention provides a monitoring system for monitoring a hand brake of at least one unpowered rail wagon according to the present invention, said monitoring system configured for performing a method according to the present invention.

In another aspect preferably relating to point 1-15, the present invention provides a kit for monitoring a hand brake of at least one unpowered rail wagon according to a method according to the present invention; said unpowered rail wagon comprising a chassis; said hand brake comprising a hand-operated mechanical device, a brake linkage system and at least one brake pad; said hand-operated mechanical device, said brake linkage system and said at least one brake pad mechanically connected; said kit comprising:
- a detection module comprising at least one detector element for evaluating a state of said hand brake belonging to said at least one unpowered rail wagon, whereby said evaluating of said state involves a dislocation of said brake linkage system with respect to a calibration point fixed with respect to the chassis, whereby said state is characteristic of at least the hand brake being disengaged;
- a monitoring module configured for receiving said state characteristic of at least the hand brake being disengaged and configured for communicating said state to an external device.

The advantage of such an unpowered rail wagon, such a monitoring system and such a kit preferably relating to point 1-15 are similar to those of a method according to the present invention and preferably relating to point 1-15. Additionally, such a kit is advantageous in that it can easily be used to mount a monitoring system on an existing rail wagon with pre-installed hand brake.

The invention is further described by the following non-limiting examples which further illustrate the invention, and are not intended to, nor should they be interpreted to, limit the scope of the invention.

EXAMPLES

Example 1

Rail Wagon with Monitored Hand Brake—Two Detector Elements

Figure 2:
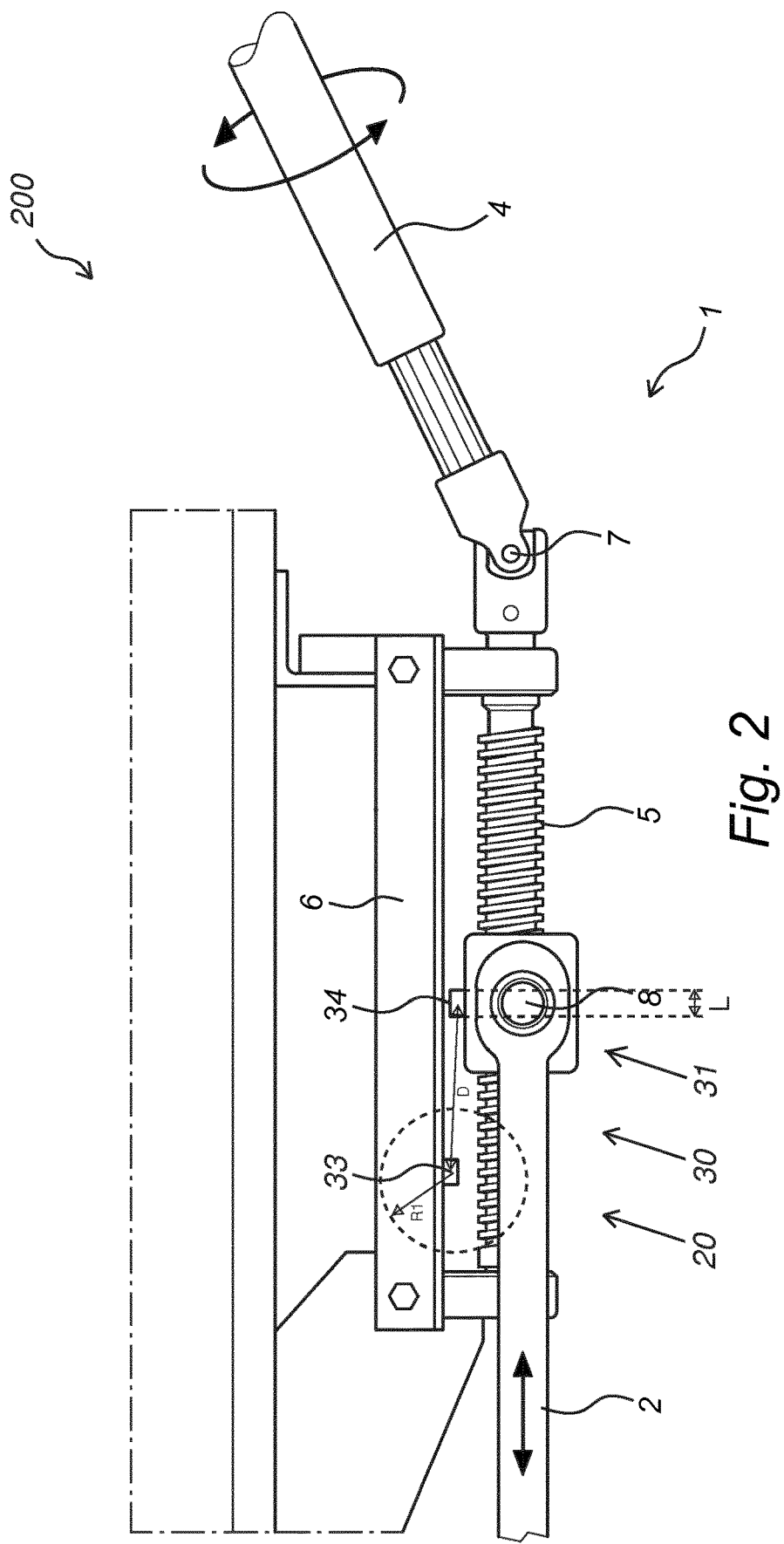
FIG. 2 shows an example embodiment of a monitoring system with two detector elements according to the present invention.

FIG. 1 and FIG. 2 illustrate Example 1. FIG. 1 shows a rail wagon provided with a monitoring system 30 according to the present invention. FIG. 2 shows a close-up of a bottom portion 200 of the rail wagon, with a monitoring system comprising two detector elements (33, 34). The rail wagon 10 comprises a hand brake 1, a chassis 11 and a plurality of wheels 13, with one bogie 11 per two wheels 13.

The hand brake 1 comprises a brake linkage system 20 and one or more braking pads 3. Furthermore, the hand brake comprises a spindle 5, a rotating linkage 4 and a wrist joint linkage 7. The spindle 5 belongs to a screw drive, whereby said spindle 5 comprises a helical screw thread. The brake linkage system 20 comprises a brake linkage 2 and a transmission 8. The transmission 8 comprising an annular portion is mounted over the spindle 5 and comprises screw thread on the inside of its annular portion to allow back-and-forth movement of the transmission 8 over the spindle 5. The spindle 5, the wrist joint linkage 7 and the rotating linkage 4 are connected such that a rotational movement of the rotating linkage 4 is carried over via the wrist joint linkage 7 into a proportional rotational movement of the spindle 5. The transmission 8 between the spindle 5 and the brake linkage 2 is such that the rotational movement of the screw-threaded linkage is carried over via the transmission 8 into a linear translation movement of the brake linkage 2, allowing to engage or disengage the hand brake 1. The hand brake is operated manually via a hand wheel 9. Hereby, the rotation of the hand wheel 9 is carried over proportionally to the rotating linkage 4.

The brake linkage 2, the transmission 8 and the spindle 5 are connected such that a linear translation movement of the transmission 8 in a first direction results in the engaging of the hand brake 1, and the linear translation movement of the transmission 8 in a second direction opposite to the first direction results in the disengaging of the hand brake 1. In this sense, the hand brake 1 is configured so as to restrict the movement of the transmission 8 to a simple linear movement with respect to the chassis 11 of the rail wagon 10. For this reason, it is advantageous to mount the second detector element 34 on this transmission 8 belonging to the brake linkage system 20, thereby obtaining a simple and predictable path of the second detector element during the operation of the hand brake 1.

For example 1, the monitoring system 30 comprises a detection module 31 comprising a first detector element 33 and a second detector element 34. Both the first 33 and second 34 detector element are preferably wireless, i.e. without wires running out of the detector element. The first detector element 33 is mounted directly or indirectly on the chassis 11 to ensure a fixed position with respect to the chassis 11. In the embodiment illustrated in FIG. 1-2, the first detector element 33 is mounted on a bar 6 belonging to the chassis 11. The second detector element 34 is mounted on the brake linkage system 20. In the embodiment illustrated in FIG. 1-2, the second detector element 34 is mounted on the transmission 8 which is pivotally connected to the brake linkage 2. Therefore, the second detector element 34 is fixed with respect to the transmission 8.

The monitoring system 30 further comprises a monitoring module 32 that is connected with said detection module 31.

The first detector element 33 serves as a calibration point and is fixed with respect to the chassis 11. The second detector element 34 provides the reference of the dislocation of the brake linkage system 20. In a preferred embodiment, the first detector element 33 is a detector, in this example a reed switch, preferably a wireless battery-powered reed switch comprising a wireless network interface, and the second detector element 34 is a wireless passive detector element that is releasably attached, e.g. a magnet. The evaluating of whether or not the hand brake is disengaged involves monitoring a dislocation of said brake linkage system 20 with respect to said calibration point 33. More precisely, the monitoring system 30 determines whether the magnet 34 is within range of the reed switch 33 or not. Hereby, the magnet 34 is within range of the reed switch 33 if the detected distance D (or, equivalently, detected signal level) between them is smaller than a preset maximum radius value R1. This corresponds to a disengaged hand brake 1. Conversely, the magnet 34 is out of the range of the reed switch 33 if the detected distance D is larger than said preset maximum radius value R1. This corresponds to a hand brake 1 that is not disengaged, and is at least partially engaged. Hereby, the disengaged state corresponds to a "full" disengagement, whereby the transmission 8 is screwed to a position as far away as possible from the rotating linkage 4. With reference to FIGS. 1 and 2, this corresponds to the left-most position for the transmission 8, whereby the magnet 34 and the transmission 8 are essentially aligned with the reed switch 33. This is to be distinguished from the actual disengagement of the brake pads and the wheels, which occurs in case of full disengagement but may also occur in cases with slight engagement. Still with reference to FIGS. 1 and 2, the latter corresponds to positions of the magnet 34 and the transmission 8 that are not completely aligned with the reed switch 33, but rather situated at least slightly to the right of to the reed switch 33. In a preferred embodiment, only a position of full disengagement counts as a valid position, and even a position with only slight engagement is treated as "not disengaged", and may trigger events such as a sound alarm or an alert notification.

The second detector element (34) is releasably attached, which eases maintenance of the brake linkage system, and also allows easy repositioning while calibrating the monitoring system. The maximum dimension L, in this example the length, of the passive detector element is smaller than 60 mm, preferably smaller than 40 mm.

Together, the first and second detector element (33, 34) and the monitoring module allow for accurate monitoring of whether the hand brake is disengaged. In an alternative embodiment, the first and second detector element swap roles, whereby the second detector element 34 is the detector, preferably a reed switch, and the first detector element 33 is the magnet.

Example 2

Rail Wagon with Monitored Hand Brake—Three Detector Elements

Figure 3:
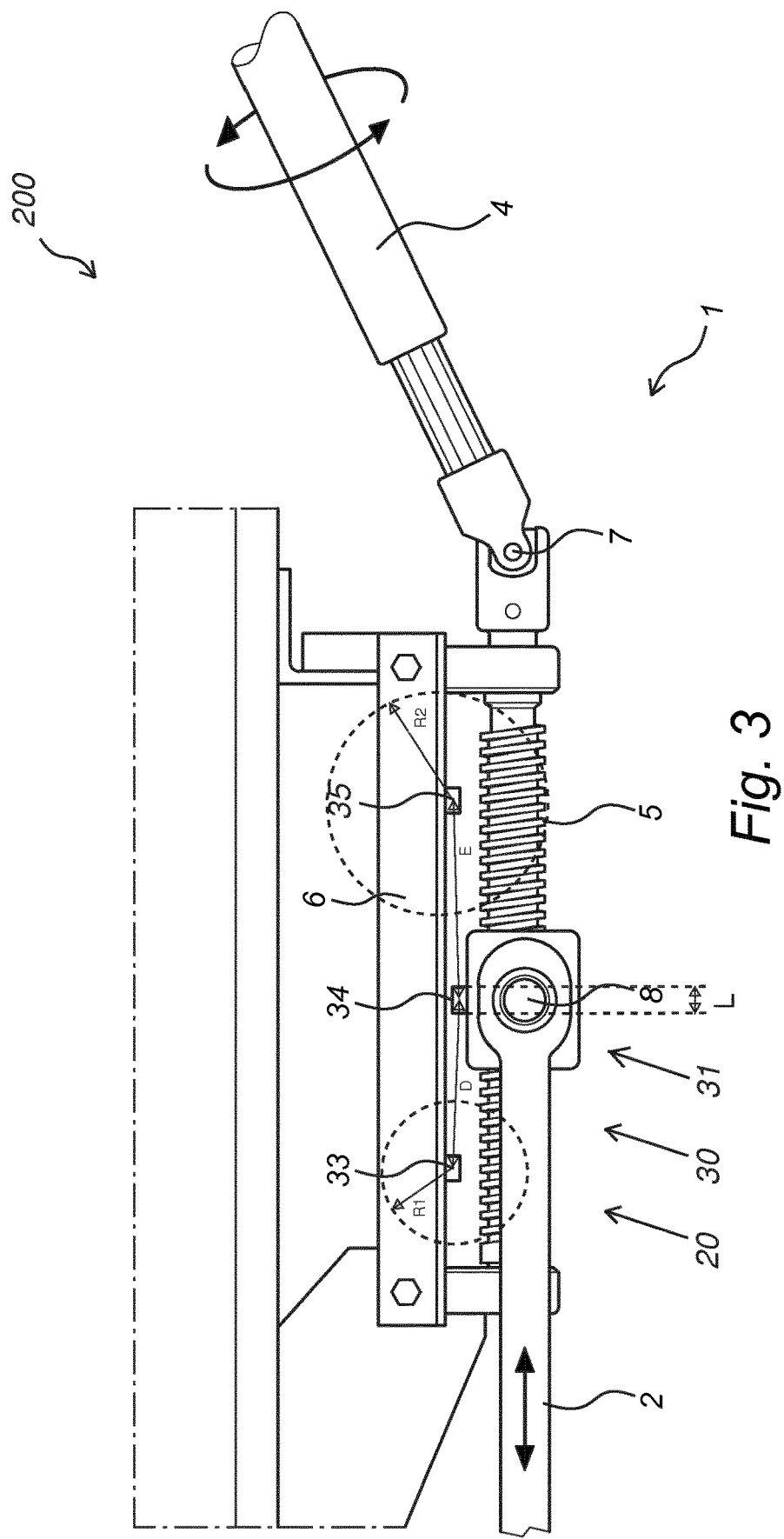
FIG. 3 shows an example embodiment of a monitoring system with three detector elements according to the present invention.

Example 2 is illustrated by FIG. 1 and FIG. 3. It concerns the same rail wagon as considered in Example 1, except for the presence of three detector elements (33, 34, 35) instead of two (33, 34).

For example 2, the monitoring system 30 comprises a detection module 31 comprising not only a first and second detector element (33, 34) but also a third detector element 35. Due to the presence of the third detector element, the monitoring system is not only capable of monitoring whether the hand brake is disengaged, but also whether the hand brake 1 is engaged.

In a preferred embodiment, the first detector element 33 is a first reed switch, and the second detector element 34 is a magnet, similar to Example 1. The third detector element 35 is a second reed switch, which is mounted on the chassis 11. Together with the magnet 34, the second reed switch 35 allows monitoring whether the hand brake 1 is engaged. This is possible by determining whether the magnet 34 is within range of the second reed switch 35. Hereby, the magnet 34 is within range of the second reed switch 35 if the detected distance E (or, equivalently, detected signal level) between them is smaller than a second preset maximum radius value R2, said second maximum radius value R2 preferably being equal to or larger than the maximum radius value R1 associated with the first reed switch 33. This corresponds to an engaged hand brake 1. Conversely, the magnet 34 is out of the range of the second reed switch 35 if the detected distance E is larger than said second preset maximum radius value R2. This corresponds to a hand brake 1 that is not engaged, and is at least partially engaged. Preferably, this "judgment" is made in view of and combined with the judgment based on the detection of the magnet 34 by the first reed switch 33. Hereby, the monitoring performed by the second reed switch 35 may additionally serve as a control mechanism with respect to the monitoring performed by the first reed switch. In this sense, the addition of the second reed switch may contribute to the reliability of the monitoring of the task of the first reed switch, i.e. determining whether the hand brake is disengaged.

Together, the first, second and third detector (33, 34, 35) and the monitoring module allow for accurate monitoring of whether the hand brake is disengaged. Furthermore, they also allow monitoring of whether the hand brake is engaged. In an alternative embodiment, the first, second and third detector (33, 34, 35) swap roles, whereby the first and third detector are magnets, and the second detector is the (only) reed switch. The latter alternative embodiment has the advantage that it reduces the number of reed switch components needed per monitored hand brake from 2 to 1. This may be advantageous because it reduces complexity and/or cost of implementation of the invention.

It is supposed that the present invention is not restricted to any form of realization described previously and that some modifications can be added to the presented example of fabrication without reappraisal of the appended claims. For example, the present invention has been described referring to reed switches and optical detectors as some of the detector elements, but it is clear that the invention can be applied also with other types of detector elements, such as RFID devices, laser-interferometric devices or Hall sensors.

The invention claimed is:

1. Method for monitoring a hand brake (1) of at least one rail wagon (10), comprising a chassis (11) by means of a monitoring system (30); said hand brake (1) comprising a hand-operated mechanical device (9), a brake linkage system (20) and at least one brake pad (3); said hand-operated mechanical device (9), said brake linkage system (20) and said at least one brake pad (3) mechanically connected; said monitoring system (30) comprising a detection module (31) and a monitoring module (32); said detection module (31) comprising at least one detector element (33, 34, 35); wherein said at least one detector element comprises a first detector element (33), a second detector element (34) and a third detector element (35); said monitoring module (32) comprising a processor, tangible non-volatile memory, instructions on said memory for instructing said processor; said method comprising the subsequent steps of:

(a) evaluating a state of said hand brake (1) belonging to said at least one rail wagon (10) by means of said detection module (31);

(b) communicating said state to said monitoring module (32);

(c) storing said state and a timestamp on said memory of said monitoring module (32);

wherein said evaluating of said state involves a dislocation of said brake linkage system (20) with respect to a calibration point (33, 35) that is fixed with respect to the chassis (11), wherein said state is characteristic of at least the hand brake (1) being disengaged or engaged; wherein said first detector element (33, 35) is fixed with respect to the chassis (11); wherein said first detector element (33, 35) determines said calibration point;

wherein the second detector element (34) is fixed with respect to a portion of the brake linkage system (20); in that said evaluating of said state involves determining whether said first (33, 35) and second (34) detector element are within each other's range, thereby detecting that the hand brake (1) is disengaged, wherein said detection module (31) further comprises a third detector element (35) fixed with respect to the chassis (11); and wherein the evaluating of said state involves determining whether said second (34) and third (35) detector element are within each other's range, thereby detecting that the hand brake (1) is engaged; wherein said second (34) and third (35) detector element are within each other's range if a distance (E) between said second (34) and third (35) detector element is smaller than a second maximum radius value (R2), said second maximum radius value (R2) being smaller than 100 mm.

2. Method according to claim 1, wherein one of said first (33, 35) and second (34) detector element is an emitter detector element adapted for emitting a signal originating from said emitter detector element; and wherein the other of said first (33, 35) and second (34) detector element is a receiver detector element adapted for detecting said signal from said emitter detector element.

3. Method according to claim 1, wherein one of said first (33, 35) and second (34) detector element is a wireless passive detector element adapted for being detected by the other of said first (33, 35) and second (34) detector element; wherein the other of said first (33, 35) and second (34) detector element is an active detector element adapted for detecting said passive detector element.

4. Method according to claim 1, wherein at least said second detector element (34) is releasably attached; wherein a maximum dimension (L) of said second detector element (34) is smaller than 60 mm.

5. Method according to claim 1, wherein said first (33, 35) and second (34) detector element are within each other's range if a distance (D, E) between said first (33, 35) and second (34) detector element is smaller than a first maximum radius value (R1), said first maximum radius value (R1) being smaller than 80 mm.

6. Method according to claim 1, wherein said monitoring module (32) comprises a communication interface; and in that said method comprises an additional step (d) concerning the transmitting of said state to a remote server via said communication interface.

* * * * *